(12) United States Patent
Neubrand (10) Patent No.: US 7,762,613 B2
(45) Date of Patent: Jul. 27, 2010

(54) LATCH MECHANISM FOR CONVERTIBLE TOPS

(75) Inventor: Frank Neubrand, West Bloomfield, MI (US)

(73) Assignee: Wilhelm Karmann GmbH (DE)

( * ) Notice: Subject to any disclaimer, the term of this patent is extended or adjusted under 35 U.S.C. 154(b) by 120 days.

(21) Appl. No.: 12/246,264

(22) Filed: Oct. 6, 2008

(65) Prior Publication Data

US 2009/0091156 A1    Apr. 9, 2009

Related U.S. Application Data

(60) Provisional application No. 60/977,932, filed on Oct. 5, 2007.

(51) Int. Cl.
*B60J 7/185* (2006.01)
(52) U.S. Cl. ..................................................... 296/121
(58) Field of Classification Search ............ 296/107.01, 296/108, 121
See application file for complete search history.

(56) References Cited

U.S. PATENT DOCUMENTS

| | | | |
|---|---|---|---|
| 2003/0047961 A1* | 3/2003 | Nania ................. | 296/107.08 |
| 2004/0222658 A1* | 11/2004 | Dilluvio ............. | 296/107.08 |
| 2006/0244284 A1* | 11/2006 | Solo et al. ......... | 296/107.01 |

* cited by examiner

*Primary Examiner*—Lori L Lyjak
(74) *Attorney, Agent, or Firm*—Gifford, Krass, Sprinkle, Anderson & Citkowski, P.C.

(57) ABSTRACT

A latch mechanism for releasably locking at least a portion of a convertible top of a motor vehicle in the closed position. The latch mechanism has a locked position in which the latch mechanism is lockingly engaged with the receiver to lock at least a portion of the top in the closed position and an unlocked position in which the latch mechanism is disengaged with the receiver and allows movement of the at least portion of the top between the closed and open positions. The latch mechanism has a memory metal element operative for actuating the latch mechanism between the locked and unlocked positions.

19 Claims, 6 Drawing Sheets

LATCH MECHANISM FOR CONVERTIBLE TOPS

CROSS-REFERENCE TO RELATED APPLICATIONS

This application claims priority of U.S. Provisional Patent Application Ser. No. 60/977,932 filed Oct. 5, 2007, which is incorporated herein by reference.

FIELD OF THE INVENTION

The invention relates to a locking mechanism for a convertible top. More particularly, the invention relates to a convertible top locking mechanism having a shape memory alloy element for actuating the moving parts of the locking mechanism.

BACKGROUND OF THE INVENTION

Convertible motor vehicles include retractable tops that are movable between an extended position extending over and covering a passenger compartment and a retracted position disposed in a storage space typically located behind the passenger compartment. Typically, latches are used for releasably locking the top in the closed position. For example, header latches are used for releasably coupling a front end of a retractable top to a top portion of a windshield or windshield header. Some retractable tops include articulating rigid panels and latches for releasably interlocking adjacent panels to each other and/or to adjacent body parts in the vehicle. It remains desirable to provide an improved convertible top latch design which can be used to releasably lock various portions of the top in the closed position.

SUMMARY OF THE INVENTION

According to one aspect of the invention, a motor vehicle includes a windshield, a retractable top and a latch mechanism. The windshield has a header extending along an upper end thereof. The retractable top is movable between a closed position extending over a passenger compartment and an open position disposed in a storage compartment behind the passenger compartment. The convertible top has a front end that extends along the header in the closed position. The latch mechanism is releasably engageable with a receiver for locking at least a portion of the top in the closed position. The latch mechanism includes at least one locking member movable between a locked position engaged with a receiver for locking the top in the closed position and an unlocked position allowing movement of the top between closed and open positions. The latch mechanism includes a blocking member movable between an engaged position retaining the locking member in the locked position and a disengaged position spaced apart from the locking member to allow movement of the locking member between the locked and unlocked positions. The latch mechanism further includes a memory metal element having an end coupled to the blocking member. The memory metal element changes in length in response to selective application of energy thereto and causes corresponding actuation of the blocking member between the engaged and disengaged positions.

According to another aspect of the invention, a motor vehicle includes a windshield, a retractable top and a latch mechanism. The windshield has a header extending along an upper end thereof. The retractable top is movable between a closed position extending over a passenger compartment and an open position disposed in a storage compartment behind the passenger compartment. The convertible top has a front end that extends along the header in the closed position. The latch mechanism is releasably engageable with a receiver for locking at least a portion of the top in the closed position. The latch mechanism includes at least one locking member movable between a locked position engaged with a receiver for locking the top in the closed position and an unlocked position allowing movement of the top between closed and open positions. The latch mechanism further includes a memory metal element having an end coupled to the locking member. The memory metal element changes in length in response to selective application of energy thereto and causes corresponding actuation of the locking member between the locked and unlocked positions.

According to a further aspect of the invention, a motor vehicle includes a windshield and a retractable top. The windshield has a header extending along an upper end thereof. The top is movable between a closed position extending over a passenger compartment and an open position disposed in a storage compartment behind the passenger compartment. The top has a front end that extends along the header in the closed position. The vehicle also includes a latch mechanism releasably engageable with a receiver for locking at least a portion of the top in the closed position. The latch mechanism has a locked position in which the latch mechanism is lockingly engaged with the receiver to lock at least a portion of the top in the closed position and an unlocked position in which the latch mechanism is disengaged with the receiver and allows movement of the at least portion of the top between the closed and open positions. The latch mechanism has a memory metal element operative for actuating the latch mechanism between the locked and unlocked positions.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
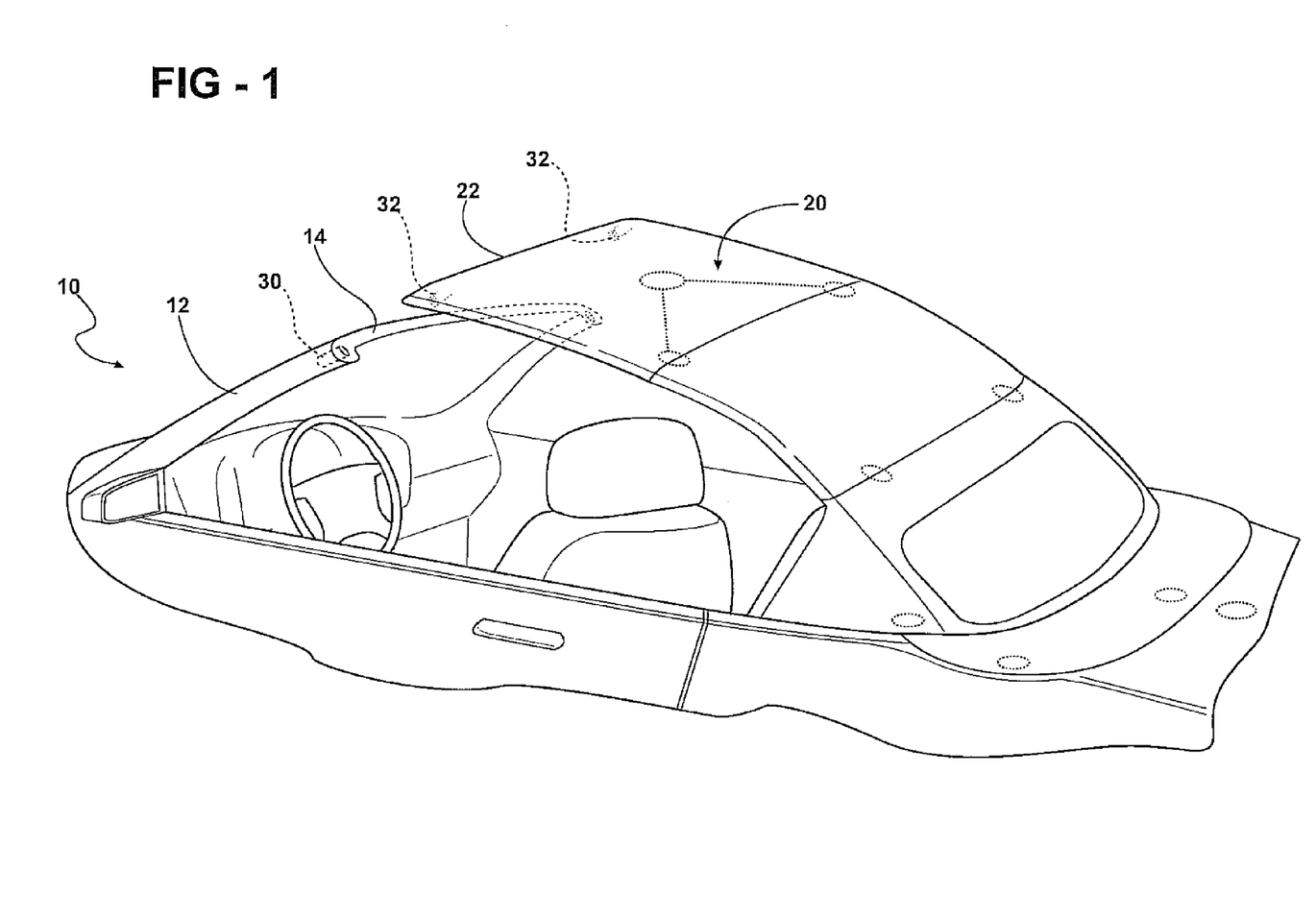
FIG. 1 is perspective view of a portion of a convertible motor vehicle according to the invention.

Referring to FIG. 1, a convertible vehicle according to the invention is generally indicated at 10. The motor vehicle 10 includes a windshield 12 and a retractable top 20. The windshield 12 has a header 14 extending along an upper end thereof. The retractable top 20 is movable between a closed position extending over a passenger compartment in the vehicle and an open position disposed in a storage compartment behind the passenger compartment. The convertible top 20 has a front end 22 that extends along the header 14 when the top 20 is in the closed position. Described in greater detail below, the vehicle 10 also includes a latch mechanism 30 for releasably locking at least a portion of the top 20 in the closed position.

Figure 2:
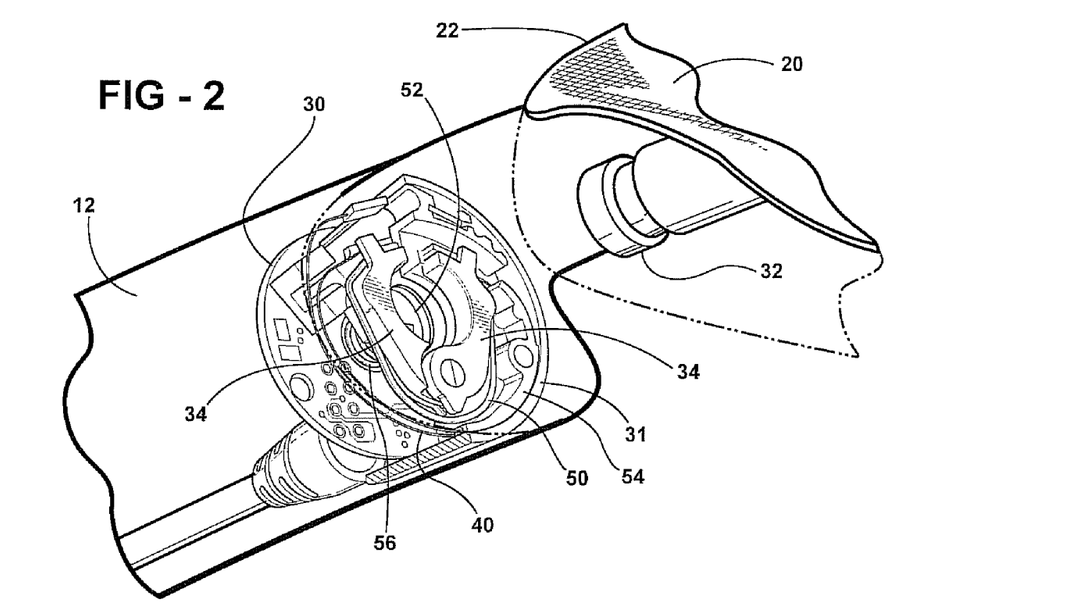
FIG. 2 is an enlarged perspective view of the motor vehicle and a latch mechanism according to one embodiment of the invention for releasably locking the top in the closed position, with the latch mechanism shown in an unlocked position.
Figure 3:
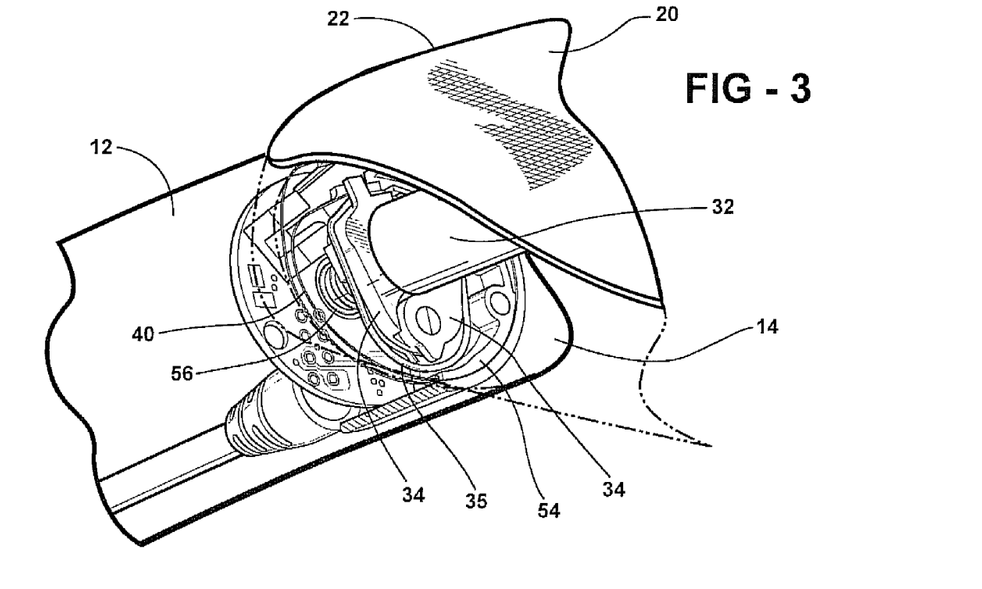
FIG. 3 is an enlarged perspective view of the motor vehicle with the latch mechanism of FIG. 2 shown in a locked position and retaining the convertible top in the closed position.

Referring to FIGS. 2 and 3, a first embodiment of the invention is shown, wherein the latch mechanism 30 is supported by the header 14 of the windshield 12 and the receiver 32 extends from the front end 22 of the top 20. The latch mechanism 30 is releasably lockable with a receiver 32 for retaining at least a portion of the top 20 in the closed position. The latch mechanism 30 includes a housing 31 enclosing the various components of the latch mechanism 30 and adapted for fixedly securing the latch mechanism 30 to the vehicle 10. The latch mechanism 30 includes at least one locking member 34 movable relative to the housing 31 between a locked position engaged with the receiver 32 for locking the top in the closed position and an unlocked position allowing movement of the top 20 between closed and open positions. A biasing member 35 may be used to bias the locking member 34 toward the locked position.

The latch mechanism 30 also includes a memory metal also known as a shape memory alloy (SMA) element 40 having at least one end 42 coupled to the locking member 34. The SMA element 40 changes in length in response to selective application of energy upon the SMA element 40 so as to cause corresponding actuation of the locking member 34 between the locked and unlocked positions. In the illustrated embodiment, the biasing member 35 continuously biases the locking member 34 toward the locked position. The SMA element 40 shortens in length upon application of electrical current thereto and causes displacement of the locking member 34 toward the unlocked position. A frame 54 supports the SMA element 40 within the latch mechanism 30. The SMA element 40 may be provided in multiple coils or windings extending about the frame 54 depending on the desired amount of displacement of the locking member 34.

In the embodiment illustrated in FIG. 2, the latch mechanism 30 includes a pair of locking members 34 pivotally coupled to each other for movement between the locked and unlocked position and continuously biased toward each other by the biasing member 35. Each end 42 of the SMA element 40 is fixedly secured to a respective locking member 34, so that the length change of the memory metal element 40 causes substantially synchronized movement of the locking members 34 between the locked and unlocked positions. In the locked position (FIG. 3), the locking members 34 contact opposite sides of the receiver 32 to retain the top 20 in the closed position. In the unlocked position (FIG. 2), the locking members 34 are spaced apart by a distance larger than the receiver 32 to allow movement of the receiver 32 from the space between the locking members 34 and, in turn, movement of the top 20 into and out of the closed position.

The latch mechanism 30 may also include an eject mechanism for pushing the receiver 32 away from the latch mechanism 30, i.e. for biasing the top 20 away from the closed position, after unlocking the locking member 34. The eject mechanism helps the receiver 32 to clear the locking member 34 as the locking member 34 returns to the locked position due to the bias of the biasing member 50. The eject mechanism includes a plug 52 disposed in a space between the locking members 34 for engaging the receiver 32 as the top 20 is moved toward the closed position. A helical spring 56 extends between the plug 52 and the latch mechanism 30 and is compressed as the receiver 32 is inserted into the space between the locking members 34.

Figure 4:
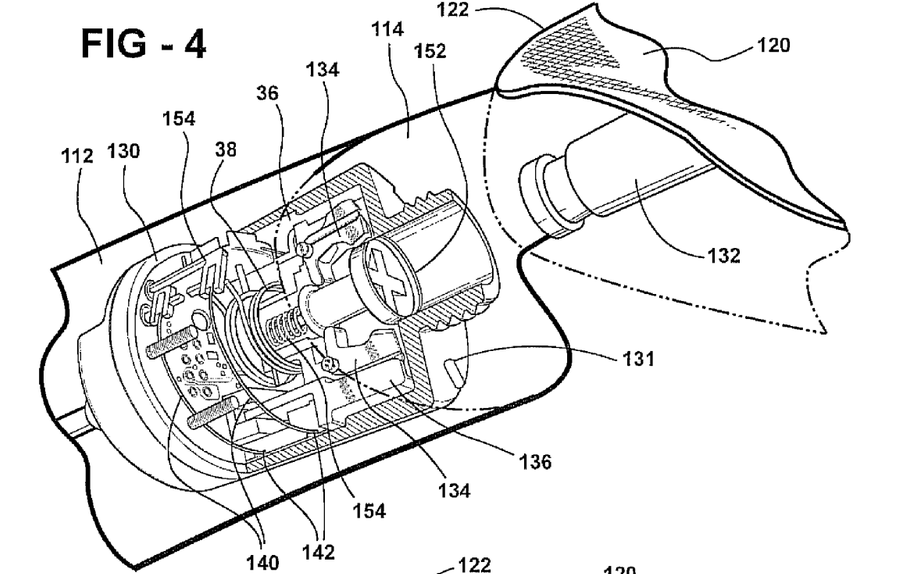
FIG. 4 is an enlarged perspective view of the motor vehicle and a latch mechanism according to a second embodiment of the invention, with the latch mechanism shown in the unlocked position.
Figure 5:
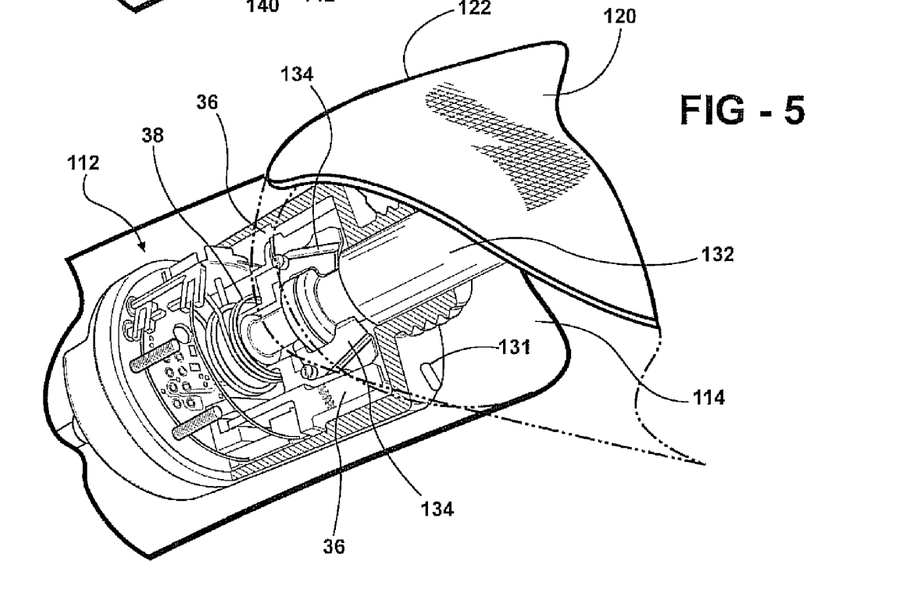
FIG. 5 is an enlarged perspective view of the motor vehicle and the latch mechanism of FIG. 4 shown in the locked position and retaining the convertible top in the closed position.

Referring to FIGS. 4 and 5, a second embodiment of the invention is shown and like components or features described in the previous embodiments are indicated by numerals offset by 100. The latch mechanism 130 includes at least one locking member 134 movable between a locked position engaged with the receiver 132 for locking the top in the closed position and an unlocked position allowing movement of the top 120 between closed and open positions. The latch mechanism 130 includes a blocking member 136 movable between an engaged position contacting or disposed adjacent to the locking member 134 to retain the locking member 134 in the locked position and a disengaged position spaced apart from the locking member 134 to allow movement of the locking member 134 between the locked and unlocked positions. In the embodiment illustrated in FIGS. 4 and 5, the locking member 134 pivots between the locked and unlocked positions and the blocking members 136 rotate between the engaged and disengaged positions. Alternatively, the locking member and/or blocking members may be arranged to move along generally linear paths. A biasing member 138 biases the blocking member 136 toward the engaged position. The latch mechanism 130 further includes an SMA element 140 having at least one end 142 coupled to the blocking member 136. The SMA element 140 changes in length in response to selective input of energy so as to cause corresponding actuation of the blocking member 136 between the engaged and disengaged positions. More specifically, the SMA element 140 shortens in length upon application of an electrical current and causes disengagement or displacement of the blocking member 136 from the engaged position toward the disengaged position.

Figure 6:
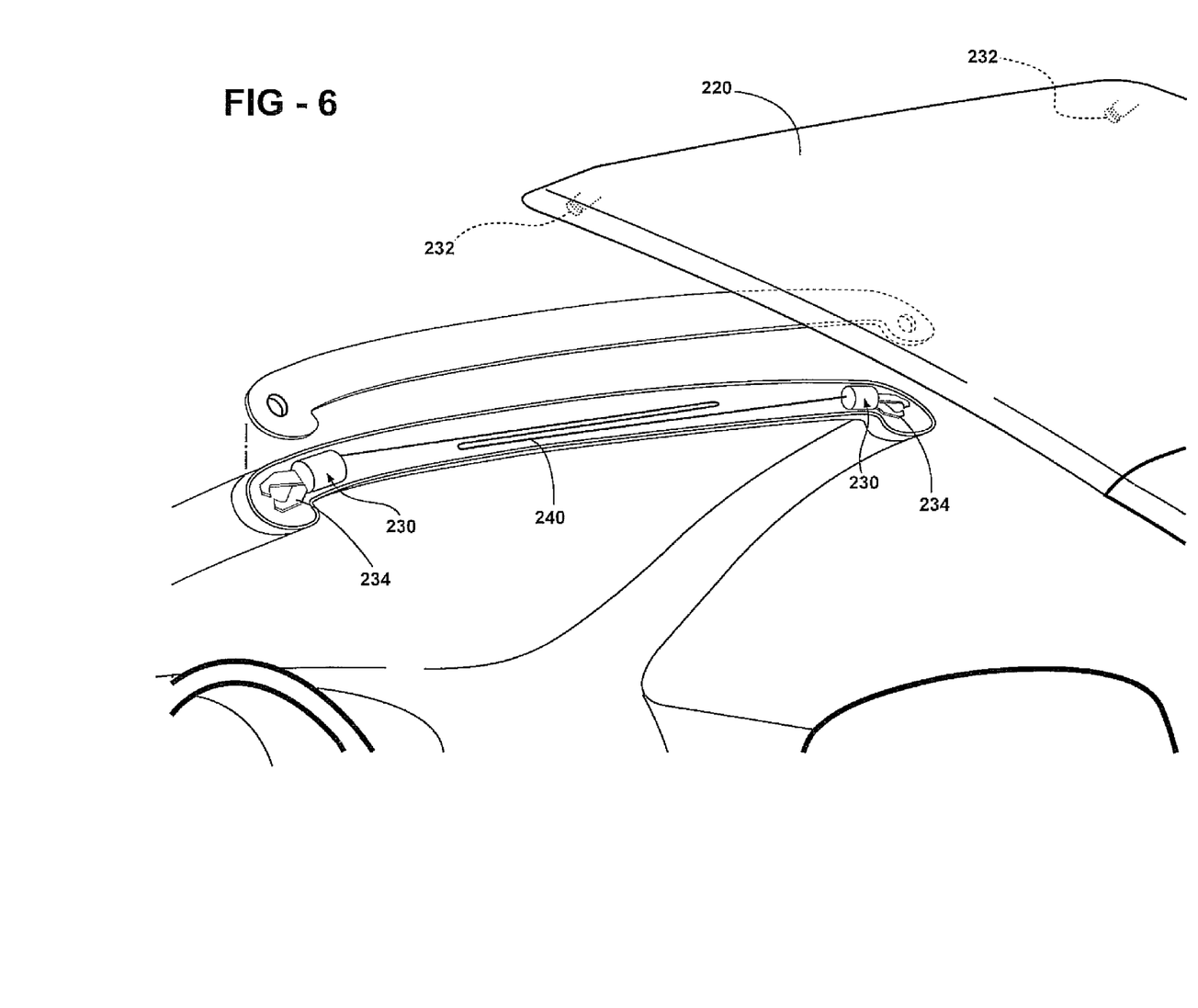
FIG. 6 is an enlarged perspective view of the motor vehicle and a latch mechanism according to a third embodiment of the invention.

Referring to FIG. 6, a third embodiment of the invention is shown, wherein the SMA element 240 actuates a generally linearly movable component within a latch mechanism 230, such as a locking member or blocking member. The latch mechanism 230 may, for example, be disposed along the header 214, such that the memory metal element 240 acts in a generally transverse direction in the vehicle, i.e. the directional component of the change in length of the memory metal element 240 extends in the generally transverse direction in the vehicle. In the illustrated embodiment, the latch mechanism 230 includes a pair of locking members 234 for releasably latching onto a pair of receivers 232 extending from the top 220. The memory metal element 240 has opposite ends each operatively coupled to one of the respective locking members 234, such that the change in length in the memory metal element 240 results in generally synchronized actuation of the pair of locking members 234. The ends of the memory metal element 240 may be directly or mechanically coupled to the locking members 234 for directly actuating the locking members 234 between the locked and unlocked positions. Alternatively, the ends of the memory metal element 240 may be coupled to a blocking member (not shown) for moving the blocking member between engaged and disengaged positions with respect to the locking members 234.

Figure 8:
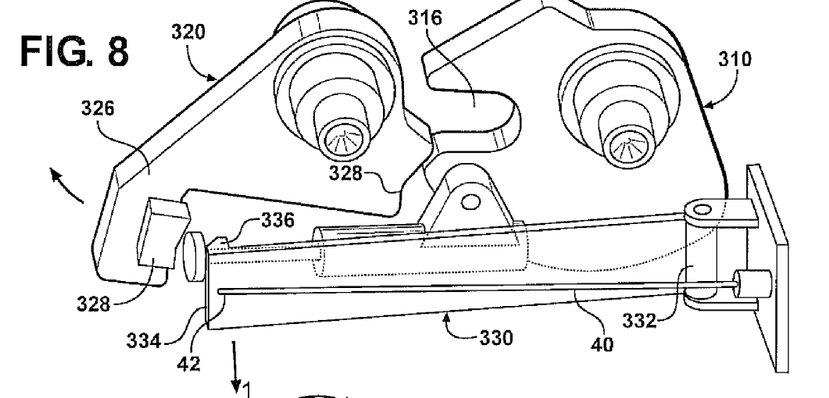
FIG. 8 is an enlarged perspective view of the embodiment shown in FIG. 7 illustrating opening of the latch mechanism.
Figure 9:
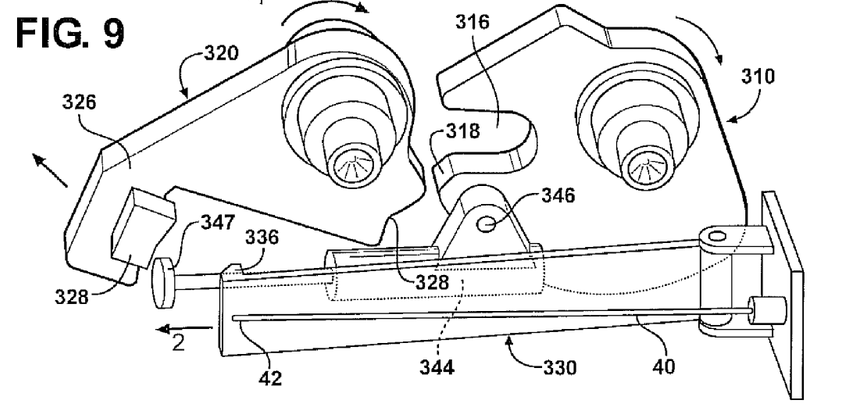
FIG. 9 is an enlarged perspective view of the embodiment shown in FIG. 8 with the latch mechanism continuing to open.
Figure 10:
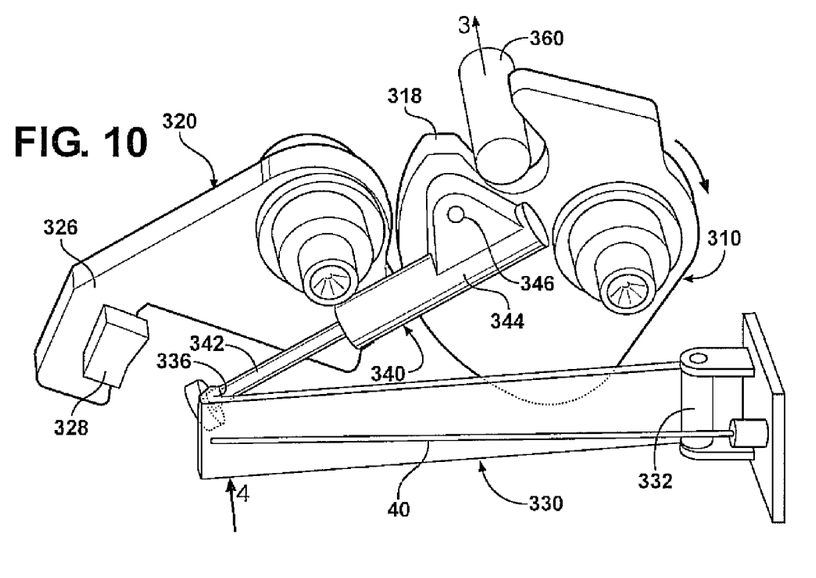
FIG. 10 is an enlarged perspective view of the embodiment shown in FIG. 9 with the latch mechanism in the open position.
Figure 11:
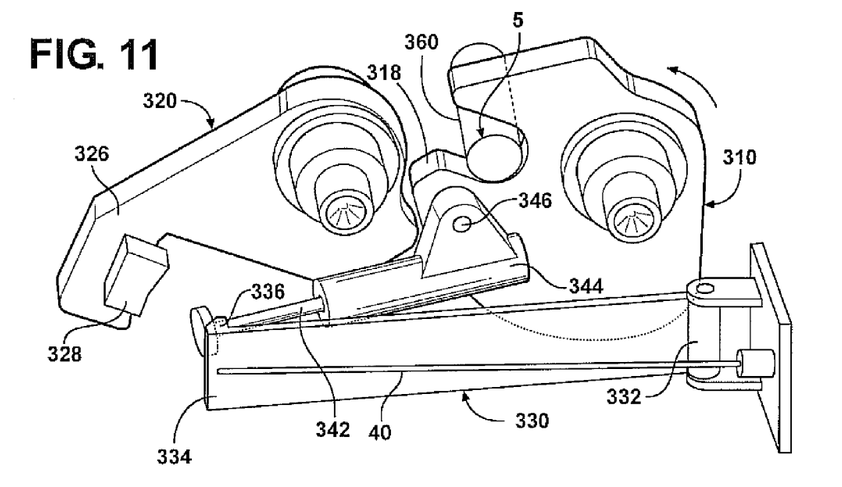
FIG. 11 is an enlarged perspective view of the embodiment shown in FIG. 10 with the latch mechanism moving towards the locked position.

Referring now to FIGS. 7-11, a fourth embodiment of the present invention is shown generally at reference numeral 60. The latch mechanism 60 can include a locking element 310, a first blocking element 320, a second blocking element 330 and a biasing member 340. The locking element 310 can have an aperture (not shown) and a pivot pin 312 such that the locking element 310 can rotate about the pin in clockwise and/or counterclockwise directions. The locking element 310 can also have a biasing member 314 that biases the element 310 towards an open position as shown in FIG. 10. For example and for illustrative purposes only, the biasing member 314 can be a spring that biases the locking element 310 to rotate in a clockwise direction to the open position. It is appreciated that the location of the biasing member 314 is not critical so long as the locking element 310 is biased towards the open position. The locking element 310 can also have a generally U-shaped opening 316 that has at least one end 318. The end 318 can have a generally inverted U-shape such that an arcuate extended section and/or a nub is present as illustrated in the figures.

Figure 7:
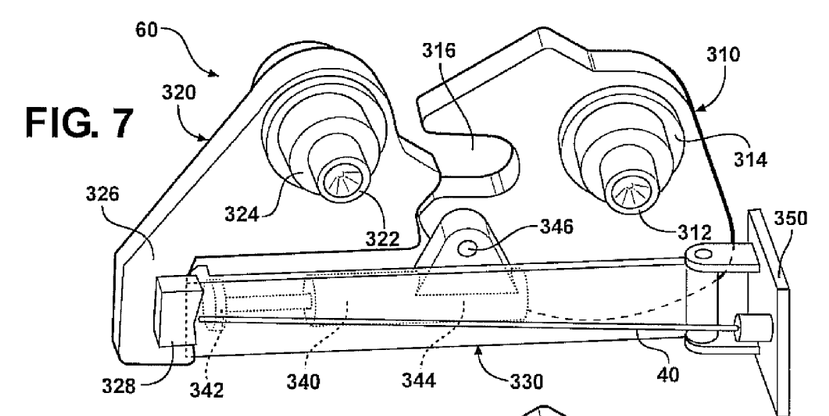
FIG. 7 is an enlarged perspective view of a fourth embodiment of the invention in a locked position.

The first blocking element 320 can have an aperture (not shown) that affords for the element 320 to rotate about an pivot pin 322 in clockwise and/or counterclockwise directions. The first blocking element 320 can also have a biasing member 324 that biases an arm portion 326 with a pawl 328 towards the locking element as shown in FIG. 7. Similar to the biasing member 314, the biasing member 324 can be a spring that biases the first blocking element 320 to rotate in a counter clockwise direction. A concave cam surface 328 can be included that affords for at least part of the end 318 to fit therewithin and for the locking element 310 to be held stationary in a locked position as shown in FIG. 7. It is appreciated that the location of the biasing member 324 is not critical so long as the arm portion 326 is biased towards the locking element such that the end 318 can be in contact with the concave cam surface 328.

The second blocking element 330 can be in the form of a bracket with a pivot end 332 and a flange end 334. It is appreciated that the pivot end 332 affords for the second blocking element 330 to pivot thereabout. The flange end 334 can be in contact with the pawl 328 and also have a flange 336 that engages a piston 342 of the biasing member 340 and affords for the biasing member to be held in a compressed position. For example and for illustrative purposes only, the biasing member 340 can be a pneumatic and/or hydraulic piston-cylinder biasing member.

An SMA element 40 can have an end 42 attached to the second blocking element 330 such that selective application of energy thereto moves the element 330 in an outward direction 1. For example, electrical energy can be applied to the SMA element 40, the result being a shrinkage in length of the element 40 and a pulling of the second blocking element 330 in the outward direction 1. Movement of the element 330 in the outward direction 1 disengages the piston 342 from the flange 336 and affords for the piston 342 to move in an extended direction 2 pushing on the pawl 328 of the first blocking element 320. Pushing of the pawl 328 affords for rotation of the first blocking element 320 in the clockwise direction as illustrated in FIGS. 8-10. It is appreciated that the rotation of the first blocking element 320 in the clockwise direction is for illustrative purposes only and based on the orientation of the locking mechanism 60, the first blocking element 320 could rotate in the counterclockwise direction when pushed upon by the piston 342.

As illustrated in FIGS. 8 and 9, pushing of the pawl 328 by the piston 342 results in the concave cam surface 328 disengaging the end 318. Thereafter, the locking element 310 is free to rotate clockwise to the open position as shown in FIG. 10. Rotation of the locking element 310 to the open position affords for a receiver 340 to be removed from the locking mechanism 60 by moving in an outward direction 3 and the second blocking element 330 to move in a direction 4 such that the piston 342 can be re-engaged with the flange 336 of the second blocking element 330. In this manner, the locking mechanism 60 affords for the release of a receiver 360 and opening of a convertible top.

When a convertible top having the latch mechanism 60 is closed, the receiver 360 can move in an inward direction 5 and reenter the U-shaped opening 316. The receiver can also push on the locking element 310 and thereby afford for the locking element 310 to rotate counterclockwise until the end 318 reengages the concave cam surface 328 of the first blocking element 320. In this manner, locking member 60 can be placed back into the locked position as shown in FIG. 7. In addition, with the piston 342 reengaged with the flange end 334 of the second blocking element 330, counterclockwise rotation of the locking element 310 places the biasing element 340 back into a compressed position. In this manner, locking mechanism 60 is returned to a locked position and the biasing member 340 is placed back into a "loaded" or compressed position without the use of an additional mechanical, pneumatic and/or hydraulic system besides what is already required to move the convertible top from the retracted to the extend position.

According to further embodiments of the present invention, the latch mechanisms described herein may also be utilized for releasably interlocking adjacent panels of a rigid retractable top design (as indicated at 60 in FIG. 1), or for releasably locking other portions of the top to other areas of the vehicle. For example, the latch mechanism(s) may be supported on an edge of one panel for releasably latching onto the receiver(s) extending from an adjacent edge of an adjacent panel to function as a panel-to-panel latch or linkage latch. The latch mechanism(s) may also be used as a downstack latch releasably latching the top to a rearward portion of the vehicle to retain the top in the open position (as indicated at 62 in FIG. 1), or as a tonneau cover latch (as indicated at 64 in FIG. 1) or decklid latch (as indicated at 66 in FIG. 1). The latch mechanism(s) may also be used as part of a cinching mechanism the top, tonneau cover and/or decklid. Some of the key advantages to utilizing the latch mechanism as described herein include a reduced overall package size versus conventional latch designs; a self contained design that provides increased flexibility in location in the convertible top design and facilitates ease of assembly and servicing.

The invention has been described in an illustrative manner. It is, therefore, to be understood that the terminology used is intended to be in the nature of words of description rather than of limitation. Many modifications and variations of the invention are possible in light of the above teachings. For example, the positions of the latch mechanisms and the receivers, as illustrated herein may be interchanged. Thus, within the scope of the appended claims, the invention may be practiced other than as specifically described.

I claim:

1. A motor vehicle comprising:
   a windshield having header extending along an upper end thereof;
   a retractable top movable between a closed position extending over a passenger compartment and an open position disposed in a storage compartment behind the passenger compartment, the convertible top having a front end that extends along the header in the closed position; and a latch mechanism releasably engageable with a receiver for locking at least a portion of the top in the closed position, the latch mechanism having:
- at least one locking member movable between a locked position engaged with the receiver for locking the top in the closed position and an unlocked position allowing movement of the top between closed and open positions;
- a blocking member movable between an engaged position retaining the locking member in the locked position and a disengaged position spaced apart from the locking member to allow movement of the locking member between the locked and unlocked positions; and
- a memory metal element having an end coupled to the blocking member, the memory metal element changing in length in response to selective application of energy thereto and causing corresponding actuation of the blocking member between the engaged and disengaged positions.

2. A motor vehicle as set forth in claim 1, wherein the latch mechanism is supported by the header of the windshield to receive the receiver extending from the front end of the retractable top and releasably lock the top in the closed position.

3. A motor vehicle as set forth in claim 2, wherein the blocking member is movable in a generally linear direction between the engaged and disengaged positions.

4. A motor vehicle as set forth in claim 3, wherein at least a directional component of the change in length of the memory metal element is substantially aligned with the direction of movement of the blocking member.

5. A motor vehicle as set forth in claim 2, wherein the locking member pivots between the locked and unlocked positions, the locking member being rotatably biased toward the locked position.

6. A motor vehicle as set forth in claim 5, wherein the blocking member is rotatably supported in the latch mechanism for movement between the engaged position maintaining the locking member in the locked position and the disengaged position spaced apart from the locking member to allow pivotal movement of the locking member between the locked and unlocked positions.

7. A motor vehicle as set forth in claim 1, wherein the retractable top includes a first panel and a second panel pivotally coupled to each other for movement between the closed and open positions, the first panel and the second panel each being substantially rigid.

8. A motor vehicle as set forth in claim 7, wherein each of the first panel and second panel has a longitudinally extending edge, the edges of the panels being adjacent to each other when the top is in the closed position, the latch mechanism being supported on the first panel to receive the receiver protruding from the edge of the second panel and releasably lock at least a portion of the top in the closed position.

9. A motor vehicle as set forth in claim 8 including a pair of latch mechanisms supported on and being spaced apart transversely along the first panel to receive a corresponding pair of receivers protruding from the edge of the second panel and releasably lock at least a portion of the top in the closed position.

10. A motor vehicle comprising:
a windshield having header extending along an upper end thereof;

a retractable top movable between a closed position extending over a passenger compartment and an open position disposed in a storage compartment behind the passenger compartment, the convertible top having a front end that extends along the header in the closed position; and a latch mechanism releasably engageable with a receiver for locking at least a portion of the top in the closed position, the latch mechanism having:
- at least one locking member movable between a locked position engaged with the receiver for locking the top in the closed position and an unlocked position allowing movement of the top between closed and open positions;
- a memory metal element having an end coupled to the locking member, the memory metal element changing in length in response to selective application of energy thereto and causing corresponding actuation of the locking member between the locked and unlocked positions.

11. A motor vehicle comprising:
a windshield having header extending along an upper end thereof;

a retractable top movable between a closed position extending over a passenger compartment and an open position disposed in a storage compartment behind the passenger compartment, the convertible top having a front end that extends along the header in the closed position; and a latch mechanism releasably engageable with a receiver for locking at least a portion of the top in the closed position, the latch mechanism having:
- at least one locking member movable between a locked position engaged with the receiver for locking the top in the closed position and an unlocked position allowing movement of the top between closed and open positions,
- a first blocking member movable between an engaged position retaining the locking member in the locked position and a disengaged position spaced apart from the locking member to allow movement of the locking member between the locked and unlocked positions;
- a second blocking member movable between a first position retaining the first blocking member in the engaged position and a second position spaced apart from the first blocking member to allow movement of the first blocking member between the engaged position and the disengaged position;
- a shape memory alloy element having an end coupled to the second blocking member, the shape memory alloy element changing in length in response to selective application of energy thereto and causing corresponding actuation of the second blocking member between the first and second positions.

12. The motor vehicle of claim 11, further comprising a biasing member attached to the locking member, the biasing member operable to move the first blocking member from the engaged position to the disengaged position.

13. The motor vehicle of claim 12, wherein the second blocking member in the first position blocks the biasing member from moving the first blocking member from the engaged position to the disengaged position.

14. The motor vehicle of claim 12, wherein the second blocking member in the second position allows the biasing member to move the first blocking member from the engaged position to the disengaged position.

15. The motor vehicle of claim 11, wherein the locking member has a U-shaped locking groove, said U-shaped locking groove dimensioned for the receiver to fit at least partially into.

16. The motor vehicle of claim 11, wherein the biasing element is a hydraulic biasing element.

17. The motor vehicle of claim 11, wherein the first blocking element has a concave cam surface, said concave cam surface dimensioned to engage said locking element in said locked position and prevent said locking element from moving to said unlocked position when said first blocking element is in said engaged position.

18. The motor vehicle of claim 17, wherein said first blocking element has a push arm, said push arm spaced apart from said concave cam surface and having a push surface.

19. The motor vehicle of claim 18, wherein said biasing element pushes on said push surface of said first blocking element when said second blocking element is in said second position.

* * * * *